Figure 1:
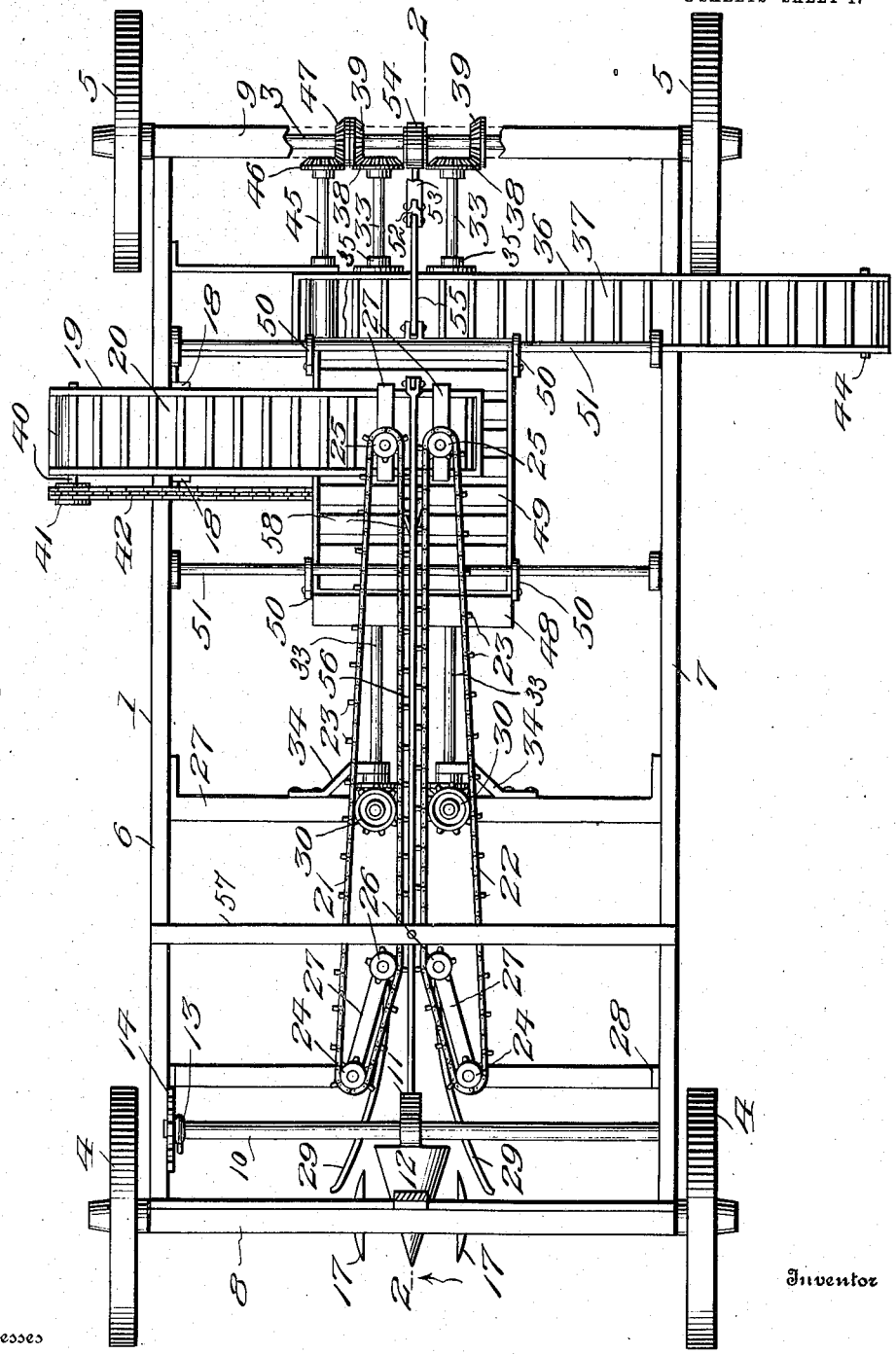

No. 848,089. PATENTED MAR. 26, 1907.
G. R. DOTSON.
BEET HARVESTING DEVICE.
APPLICATION FILED MAR. 17, 1906.

2 SHEETS—SHEET 1.

Witnesses
Edwin G. McKee
C. C. Hiner

Inventor
G. R. Dotson
By Victor J. Evans.
Attorney

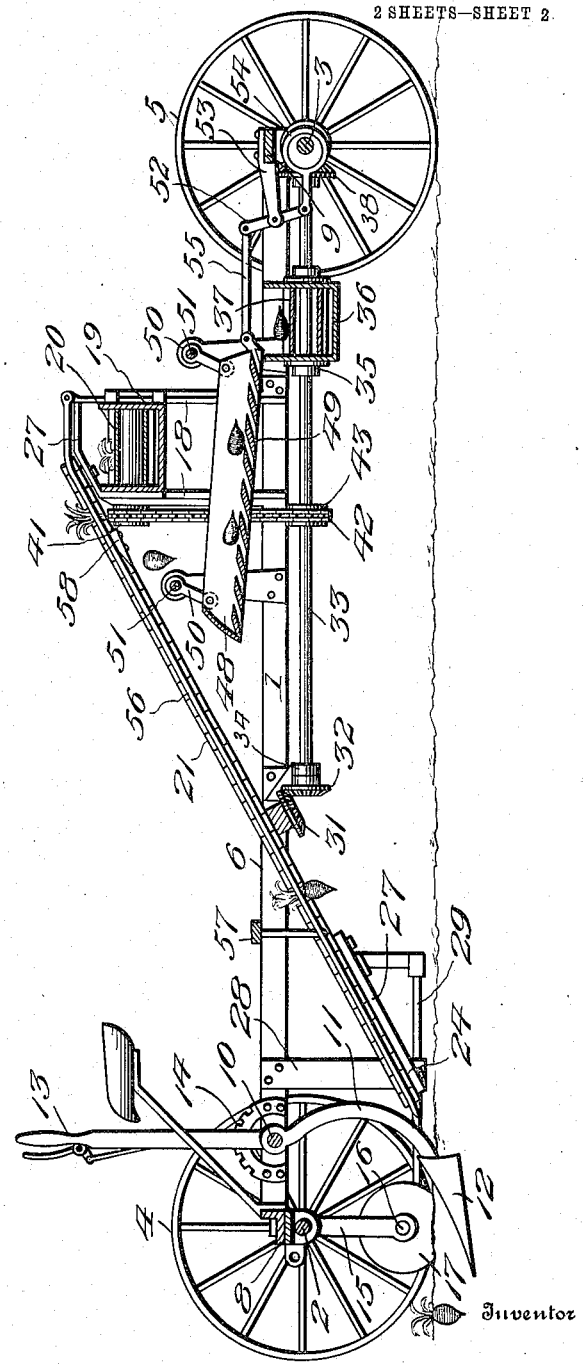

UNITED STATES PATENT OFFICE.

GEORGE R. DOTSON, OF ELBERT, COLORADO.

BEET-HARVESTING DEVICE.

No. 848,089.                    Specification of Letters Patent.           Patented March 26, 1907.

Application filed March 17, 1906. Serial No. 306,621.

*To all whom it may concern:*

Be it known that I, GEORGE R. DOTSON, a citizen of the United States of America, residing at Elbert, in the county of Elbert and State of Colorado, have invented new and useful Improvements in Beet-Harvesting Devices, of which the following is a specification.

This invention relates to a beet-harvesting device, the object of the invention being to provide a machine which when drawn or propelled in the field will remove the beets from the soil and effectually gather and convey them upwardly and toward the rear of the machine and while they are in transit remove the tops therefrom and which will also separate the beets and tops and discharge them at different points upon the ground or into suitable vehicles or receptacles.

Another object of the invention is to provide a novel construction and arrangement of devices for removing and gathering the beets and conducting them to conveying devices in such a manner as to prevent injury to the beets and insure the gathering of all the beets removed from the soil.

With these and other objects in view the invention consists of the novel construction and arrangement of parts hereinafter fully described and claimed, reference being had to the accompanying drawings, in which—

Figure 1 is a top plan view of a beet-harvester embodying my invention. Fig. 2 is a central vertical longitudinal section of the same.

The frame 1 of the machine is mounted at front and rear upon transverse axles 2 and 3, which carry sets of supporting-wheels 4 and 5. A tongue or other draft appliance (not shown) may be suitably applied to the front of the frame to enable it to be drawn across the field by draft-animals; but the machine may be moved or propelled in any other way.

In the form shown the frame is of the open rectangular type and comprises side beams 6 and 7, connected at front and rear by transverse beams 8 and 9, which may form supports for the bearings of the axles. Other connections between the side beams are provided to produce a staunch and rigid structure and support various operative elements of the machine, as hereinafter described.

Extending across the front of the frame, immediately in rear of the cross-bar 8, is a journaled rod or shaft 10, carrying a hanger 11, which supports a mole plow or digger 12, adapted to loosen up the soil and dislodge the beets therefrom. This digger may be adjusted to regulate its angle and depth of penetration by an adjusting-lever 13, fixed to the rod 10 and carrying a suitable latch or pawl to engage a rack 14 on the frame to lock the parts in adjusted position. Depending from the front cross-bar 8 are hanger-arms 15, the lower ends of which support an axle 16, carrying a pair of cutting-disks 17, arranged on opposite sides of the digger 12. As the machine moves forwardly these disks cut into the soil on opposite sides of the row, while the digger operates in the middle of the row, thus providing for the effectual loosening of the soil and removal of the beets therefrom.

Extending upwardly from the frame, at a point between the center and rear end thereof, are uprights 18, which support a transversely-arranged frame 19, in which operates an endless conveyer 20, which, as hereinafter described, receives and discharges the detached tops of the beets at one side of the machine. Extending at an upward inclination from a point immediately in rear of the digger 12 to a point immediately above the conveyer 20 are two endless conveyer belts or chains 21 and 22, provided with gripping-fingers 23 to engage and clamp the beet-tops. These chains pass at front and rear around guide sprocket-wheels 24 and 25, arranged in pairs, the forward pair 24 being arranged a greater distance apart than the rear pair 25. A pair of idlers 26 engage the inner stretches of the belts immediately in rear of the sprockets 24 and are spaced apart the same distance as the sprockets 25, so that the inner stretches of the chains will move in close parallel relation between the sprockets 25 and 26, while the forward ends of said stretches will diverge to form a flaring receiving-space for the free and unrestricted entrance of the tops of the gathered beets between the parallel portions of the inner chain-stretches, so as to be effectually gripped by the latter and conveyed upwardly and rearwardly thereby. Suitable cross-pieces or supports 27 are provided for the shafts and bearings of the various sprocket-wheels, the supports of the sprockets 24 and 26 being carried by pendent hangers 28, fixed to the frame, the supports for the sprocket-wheels 26 serving also as carriers for inwardly-converging bunching or gathering plates or wings 29, having their divergent forward ends arranged on opposite sides of the digger 12 to assemble the beets in the center line of the machine as the latter moves forward and conduct the same between the lower ends of the operating-stretches of the conveyer-chains, so that the fingers of said chains will grip the tops of the beets to carry the beets upwardly and rearwardly to the topping, shaking, and discharging devices.

The chains are driven by sprocket-wheels 30, mounted upon one of the sets of supports 27 and having fixed to their shafts beveled gears 31, which mesh with corresponding gears 32 on parallel longitudinally-extending driving-shafts 33, journaled at their forward ends in bearings 34 on said supports and adjacent their rear ends in bearings 35, carried by the frame 36 of a beet-conveyer 37, extending transversely of the frame and projecting beyond the opposite side of the same from the beet-top conveyer 20. The rear ends of the shafts 33 carry beveled gears 38, which mesh with beveled gears 39 on the rear axle 3 and are driven therefrom.

The conveyer 20 passes at its inner end around a suitable shaft (not shown) and at its outer end around a shaft 40, carrying a sprocket-wheel 41, engaged by a sprocket-chain 42, which also engages a sprocket-wheel 43 on one of the shafts 33, whereby said conveyer is driven. The outer end of the conveyer 37 is mounted on a shaft 44, and the inner end thereof passes around a shaft 45, carrying a beveled gear 46, meshing with a beveled gear 47 on the rear axle 3, whereby said conveyer 37 is driven.

Arranged beneath the inner end of the conveyer 20 is a shaking shoe or screen 48, comprising a frame open at top and at its rear end and having a bottom formed of spaced slats 49, through which the earth shaken from the topped beets is discharged. This screen is mounted to vibrate or oscillate upon links 50, carried by bracing cross-rods 51, fixed to the side beams of the frame, and has its forward end arranged beneath the conveyer-chains at a point in advance of the plane of the conveyer 20 and its open rear end arranged to discharge the topped and cleaned beets onto the conveyer 37. The shoe is shaken by suitable mechanism from the rear axle 3, that shown in the present instance comprising an oscillating lever 52, supported from the rear axle by a bracket 53 and receiving motion from an eccentric 54 on said axle and connected with the shoe by a link 55.

A rod 56 extends longitudinally between the parallel working stretches of the conveyer-chains and is fastened at its upper and lower ends to the frame of the conveyer 20 and a cross-bar 57, fixed to the beams 6 and 7. This rod serves as a support for a topping-knife 58, arranged between the working stretches of the chains above the forward end of the shoe 48 and in advance of the conveyer 20. This knife acts to cut off the tops of the beets before the latter reach the conveyer 20, allowing the beets to drop down into the shaking-shoe 48, while the beet-tops are carried by the chains to a higher point and discharged onto the conveyer 20, which delivers them upon the ground or in a suitable receptacle at one side of the machine. The beets falling into the shoe 48 are thoroughly shaken thereby and the dirt removed therefrom and are discharged from the shoe onto the conveyer 37, which conducts them to the opposite side of the machine, where they may be deposited upon the ground or into a wagon or other suitable receptacle.

The construction and mode of operation will, it is thought, be fully understood from the foregoing description, taken in connection with the accompanying drawings, and it will be apparent that an effective machine of simple construction is provided whereby the automatic harvesting, topping, and removal from the beets of the earth clinging thereto may be accomplished.

Having thus described the invention, what is claimed as new is—

1. A beet-harvester comprising a wheeled supporting-frame, means arranged at the forward end of the frame for removing the beets from the ground, transverse conveyers mounted upon the frame at different elevations and one in rear of the plane of the other, an inclined conveyer for moving the elevated beets toward the upper transverse conveyer, said inclined conveyer being adapted to grip the beet-tops, cutting mechanism for detaching the beets from the tops at a point adjacent to said upper transverse conveyer, allowing the tops to be fed forward to said transverse conveyer, a shaking-screen arranged below the upper transverse conveyer and extending forwardly and rearwardly thereof to receive the detached beets dropping from the inclined conveyer and conduct the same to the lower transverse conveyer, and means for operating the conveyers and screen.

2. A beet-harvester comprising a wheeled supporting-frame, beet-unearthing means carried at the forward end of said frame, transverse conveyers arranged upon the frame, one above and in advance of the plane of the other, a shaking-screen arranged below the upper transverse conveyer and extending in front and rear thereof and adapted to discharge the harvested and topped beets onto the lower transverse conveyer, an inclined conveyer leading from a point in rear of the beet-unearthing means to the upper transverse conveyer and adapted to grip the tops of the beets, and a severing device arranged adjacent the front of the upper transverse conveyer and above the forward end of the screen to detach the beets from their tops and permit the detached beets to drop downward into the screen.

3. In a beet-harvesting device, the combination of a frame having front and rear wheeled axles, gathering mechanism at the forward end of the frame, upper and lower transverse conveyers at the rear of the frame, the upper conveyer being arranged in advance of the plane of the lower, an inclined conveyer leading from the gathering means to the upper transverse conveyer, said inclined conveyer being adapted to grip the beets by their tops, a shaking-screen arranged below the upper transverse conveyer and extending in front and rear of the plane thereof and adapted to discharge the topped beets into the lower transverse conveyers, a cutter arranged adjacent the front of the upper transverse conveyer and above the forward end of the screen to sever the beets from their tops, allowing the beets to drop into the screen and the tops to be carried by the inclined conveyer to the upper transverse conveyer, gearing for operating the conveyers from the rear axle, and mechanism for shaking the screen from the rear axle.

4. In a beet-harvester, the combination of a wheeled supporting-frame having a rear drive-axle, beet-harvesting means arranged at the front of the frame, upper and lower transverse conveyers arranged at the rear of the frame, the upper conveyer being arranged in advance of the plane of the lower, an inclined conveyer leading from the harvesting means to the upper transverse conveyer, said conveyer being adapted to grip the beets and to conduct the tops to the upper transverse conveyer, a shaking-screen extending longitudinally through the space below the upper transverse conveyer and extending in front and rear thereof and adapted to discharge the topped beets onto the lower transverse conveyer, means for operating the conveyers and screen from the rear axle, a support arranged in juxtaposition to the upper faces of the inclined conveyer, and a cutting-knife carried by the support to sever the beets from the tops and permit the detached beets to fall into the forward portion of the screen.

In testimony whereof I affix my signature in presence of two witnesses.

GEORGE R. DOTSON.

Witnesses:
   JOHN G. VORIES,
   A. E. DAWSON.